United States Patent [19]

Fukuhara et al.

[11] 4,361,127
[45] Nov. 30, 1982

[54] INTAKE VACUUM CONTROL DEVICE FOR INTERNAL COMBUSTION ENGINE

[75] Inventors: Takao Fukuhara, Yamato; Yoshio Iwasa, Nagareyama, both of Japan

[73] Assignee: Nissan Motor Company, Limited, Yokohama, Japan

[21] Appl. No.: 181,647

[22] Filed: Aug. 26, 1980

Related U.S. Application Data

[62] Division of Ser. No. 948,560, Oct. 4, 1978, Pat. No. 4,237,842.

[30] Foreign Application Priority Data

Oct. 7, 1977 [JP] Japan .................. 52-135555[U]
Nov. 24, 1977 [JP] Japan .................. 52-157560[U]

[51] Int. Cl.³ .................................. F02M 23/04
[52] U.S. Cl. .................................. 123/587; 123/327; 137/543.17
[58] Field of Search .............. 123/587, 585, 327; 261/63 A; 137/543.17, 543.13, 542, 540

[56] References Cited

U.S. PATENT DOCUMENTS

| 1,003,479 | 9/1911 | Lucas | 137/540 |
| 2,326,598 | 8/1943 | Acosta | 123/587 |
| 3,287,899 | 11/1966 | Bintz | 123/587 |
| 3,430,647 | 3/1969 | Suchowolec | 137/543.17 |
| 3,749,122 | 7/1973 | Gold | 137/542 |
| 3,756,270 | 9/1973 | Fonseca | 123/327 |
| 3,830,254 | 8/1974 | Harrzwijne | 137/540 |

FOREIGN PATENT DOCUMENTS

| 590030 | 1/1960 | Canada | 123/587 |
| 508950 | 7/1952 | Italy | 123/587 |

Primary Examiner—Ronald H. Lazarus

[57] ABSTRACT

An internal combustion engine is provided with an intake vacuum control device through which the upstream and downstream sides of an intake passageway with respect to a throttle valve are communicable with each other, so that additional air is supplied to the intake passageway downstream of the throttle valve during engine deceleration. The intake vacuum control device is composed of a valve member which is normally biased to be closed by a coil spring which is guided by a cylindrical guide member.

10 Claims, 12 Drawing Figures

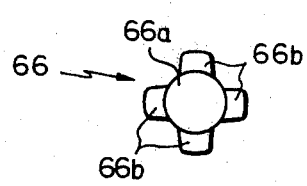
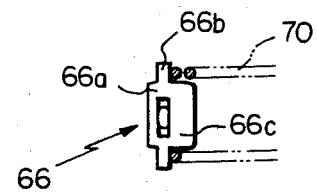
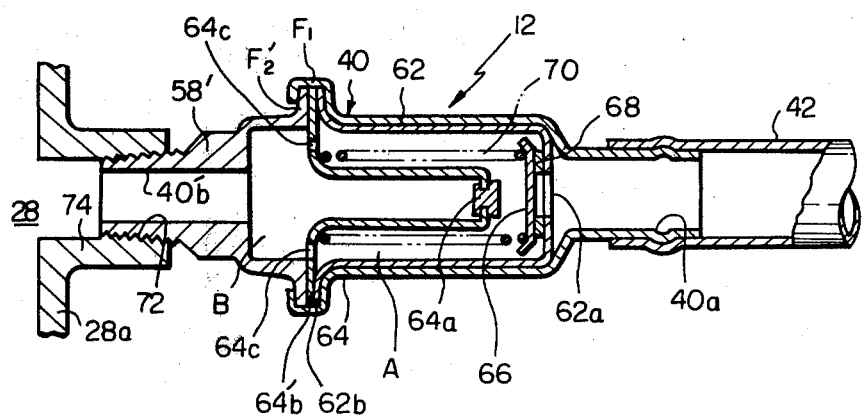

INTAKE VACUUM CONTROL DEVICE FOR INTERNAL COMBUSTION ENGINE

This is a division of application Ser. No. 948,560, filed Oct. 4, 1978 now U.S. Pat. No. 4,237,842.

BACKGROUND OF THE INVENTION

This invention relates, in general, to an improvement in an internal combustion engine, and more particularly to an intake vacuum control device for controlling intake vacuum of the engine within a desirable range.

During deceleration of an engine, a throttle valve disposed in an intake passageway is fully closed even though engine speed is high, and accordingly intake vacuum downstream of the throttle valve is excessively increased. As a result, engine oil is sucked into the combustion chambers of the engine by the action of the increased intake vacuum. This unavoidably increases the oil amount consumed or burnt in the combustion chambers. Additionally, the combustion in the combustion chambers is then temporarily deteriorated to increase the emission levels of carbon monoxide and hydrocarbons.

In order to overcome the above-stated shortcomings, it has already been proposed that an intake vacuum control valve is installed in a bypass passage connecting the upstream and downstream sides of a throttle valve. With this proposition, an excessive increase in intake vacuum can be suppressed by introducing additional air or air-fuel mixture through the intake vacuum control valve during deceleration of the engine. An example of such a proposition is disclosed in U.S. Pat. No. 3,866,583 which shows therein the intake vacuum control valves of diaphragm operated type, of ball valve type using a ball valve, and of the type in which a valve disc is movably mounted on the throttle valve.

However, such the intake vacuum control valves have encountered the problems in which the diaphragm operated type is poor in durability; and the remaining two types are poor in their response and sealing ability. Hence, it has been impossible to achieve an accurate control of the intake vacuum by using the above-mentioned types of prior art intake vacuum control valves.

SUMMARY OF THE INVENTION

It is the prime object of the present invention to provide an improved internal combustion engine in which an excessive increase in intake vacuum during deceleration can be avoided without rise of any problems.

Another object of the present invention is to provide, in an internal combustion engine, an improved intake vacuum control device for controlling, in high precision, intake vacuum of the engine within an appropriate range where serious problems such as increase in oil consumption cannot not be raised.

A still another object of the present invention is to provide, in an internal combustion engine, an improved intake vacuum control device for introducing additional air into an intake passageway upstream of engine cylinders, which is improved in its response, durability and sealing ability as compared with prior art intake vacuum control device.

A further object of the present invention is to provide, in an internal combustion engine, an improved intake vacuum control device of valve type wherein a valve member is normally biased by a coil spring in the direction to close an air inlet opening, in which although the coil spring is broken, the biasing force of the coil spring is not much lowered and therefore this intake vacuum control device maintains its normal function even after breaking of the coil spring.

A still further object of the present invention is to provide, in an internal combustion engine, an improved intake vacuum control valve of the type wherein a valve member is normally biased by a coil spring in the direction to close an air inlet opening, in which although the coil spring is broken, a broken piece of the spring cannot be sucked into engine cylinders.

Other objects, features and advantages of the intake vacuum control device according to the present invention will become more apparent from the following description taken in conjunction with the accompanying drawings in which like reference numerals are assigned to like parts and elements throughout all embodiments.

BRIEF DESCRIPTION OF THE DRAWINGS

FIG. 5 is a plan view of another example of the valve member used in the intake vacuum control device of FIG. 3;

FIG. 6 is a side elevation of the valve member of FIG. 5;

FIG. 7 is a cross-sectional view of a second preferred embodiment of the intake vacuum control device in accordance with present invention;

DESCRIPTION OF THE PREFERRED EMBODIMENTS

Figure 1:
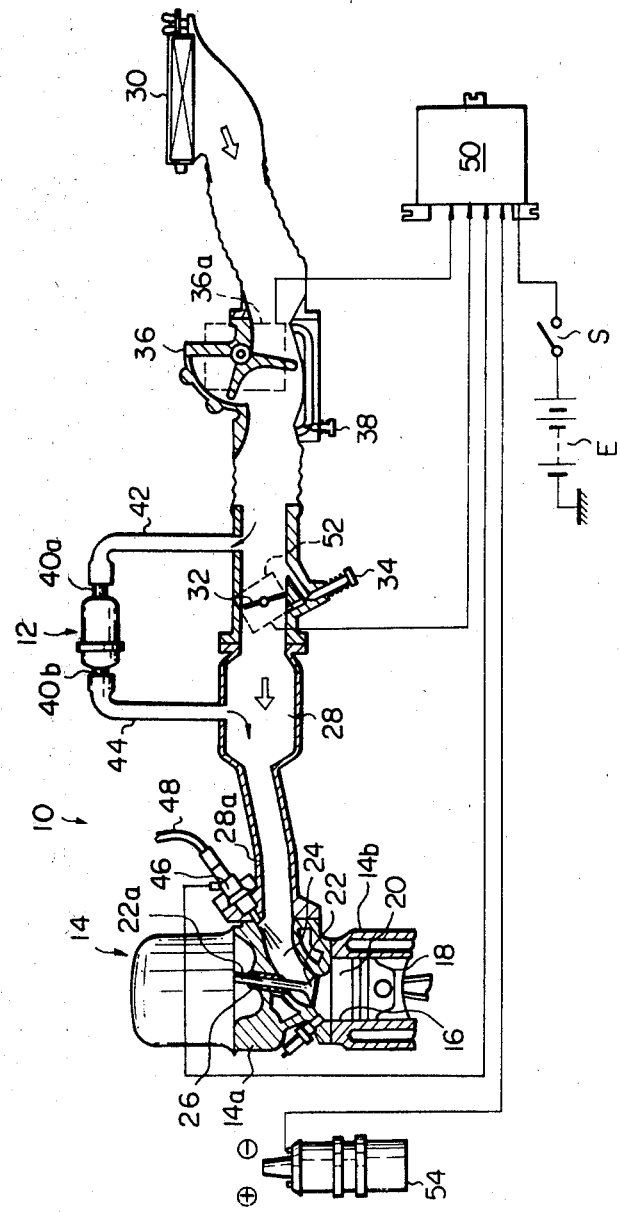
FIG. 1 is a schematic cross-sectional view of an internal combustion engine equipped with a first preferred embodiment of an intake vacuum control device in accordance with present invention.

Referring now to FIG. 1 of the drawings, there is illustrated an internal combustion engine equipped with a first preferred embodiment of an intake vacuum control device or valve 12 in accordance with the present invention. The engine 10 comprises an engine body 14 which is composed of a cylinder head 14a and a cylinder block 14b in which engine cylinders 16 (only one cylinder is shown) are formed. A piston 18 is, an usual, reciprocally movably disposed in each cylinder 16 to define a combustion chamber 20 between it and the cylinder head 14a. The combustion chamber 20 is communicable through an intake valve 22 with an intake port 24. The valve stem 22a of the intake valve 22 is slidably supported by a valve guide 26. The intake port 24 is communicable through an intake passageway 28 which is directly connected at one end thereof to the intake port 24 and is provided at the other end thereof with an air filter 30.

A throttle valve 32 is rotatably disposed in the intake passageway 28 to control the amount of intake air which is supplied through the intake passageway 28 into the combustion chamber 20. The reference numeral 34 indicates an idle adust screw. An air flow meter 36 is operatively disposed in the intake passageway 28 upstream of the throttle valve in order to measure the flow amount of intake air passing through the intake passageway 28. The reference numeral 38 represents an adjust screw for adjusting air flow amount passing through a bypass passage (no numeral) connecting upstream and downstream sides of the air flow meter 36.

The intake vacuum control device 12 comprises a casing 40 which has an air inlet pipe 40a at one end thereof and an air outlet pipe 40b at the other end thereof. The air inlet pipe 40a connects through a first pipe 42 to the intake passageway 28 upstream of the throttle valve 32. The air outlet pipe 40b connects through a second pipe 44 to the intake passageway 28 downstream of the throttle valve 32. The control device 12 is constructed and arranged to open to provide communication between the upstream and downstream sides of the throttle valve 32 when intake vacuum downstream of the throttle valve 32 exceeds a predetermined level, for example, 600 mmHg.

A fuel injector 46 is operatively disposed adjacent the cylinder head 14a and through a cylindrical wall 28a defining therein the intake passageway 28 so that the tip of the fuel injector is projected into the intake passageway 28. The fuel injector 46 constitutes part of an electronically controlled fuel injection system (no numeral). In this instance, the fuel injector 46 is located and directed to inject atomized fuel into the intake port 24. The fuel injector 46 is supplied with fuel under pressure through a fuel pipe 48 connected to a fuel source (not shown). The fuel injector 46 is electrically connected to an electronic control unit 50 which is, in turn, electrically connected to an air flow sensor 36a of the air flow meter 36 for generating an electric signal corresponding to air flow amount, an throttle position sensor 50 for generating an electric signal corresponding to the opening degree of the throttle valve 32, and an ignition coil 54 at which an electric signal corresponding to engine speed is generated. Accordingly, fuel supply from the fuel injector 46 is controllable in accordance with air flow amount in the intake passageway 28, throttle position, and engine speed. The electronic control circuit 50 is further electrically connected through an ignition switch S to a battery E.

The operation of the above-mentioned engine provided with the electronic control unit 50 will be explained with reference to FIG. 2 in which solid and broken lines indicate, respectively, intake vacuum variations in case using the intake vacuum control valve 12 and in case without using any intake control valve. Now, when the throttle valve 32 is in its idle position and the engine speed is decreased from a predetermined level higher than, for example, 1800 rpm into a level within a "fuel cutoff range", the electronic control unit 50 judges that the engine is operated under deceleration condition. Consequently, the fuel supply from the fuel injector 46 is stopped, but begins again when the engine speed is lowered below about 1200 rpm which corresponds to a terminal point $P_t$ of the "fuel cutoff range". During such the engine operation, a high intake vacuum is generated in the intake passageway 28 downstream of the throttle valve 32. When this high intake vacuum exceeds a predetermined level, for example, about 600 mmHg at which the intake vacuum control valve 12 opens to provide communication between the upstream and downstream sides of the throttle valve 32 therethrough. Then, additional air or air-fuel mixture is bypassed through the first and second pipes 42 and 44 and supplied through the intake valve 46 into the combustion chamber 20. The above-mentioned predetermined level of intake vacuum corresponds to a valve opening point $P_v$ in FIG. 2, the point $P_v$ lying at an engine speed of 1,300 r.p.m.

By virtue of this bypassed additional air or air-fuel mixture, the vacuum within the combustion chamber 20 is prevented from its excessive increase. This prevents lowering in cylinder compression pressure and increase in the amount of residual gas which remains in the combustion chamber even during exhaust stroke. Furthermore, it is effectively prevented that engine oil enters the combustion chamber 20 through a clearance between the valve stem 22a and the valve guide 26, and through a clearance between the piston 18 and the wall of the cylinder bore 16. This prevents excessive consumption of engine oil in the combustion chamber 20.

Figure 3:
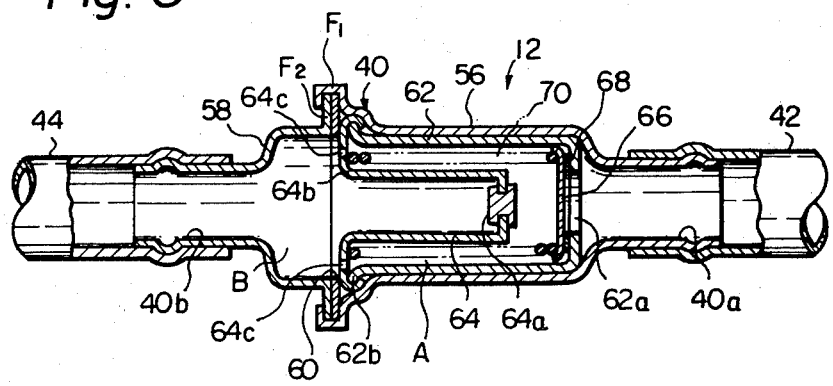
FIG. 3 is a cross-sectional view of the intake vacuum control device in FIG. 1.

FIG. 3 illustrates in detail the intake vacuum control device 12 shown in FIG. 1. The casing 40 is constructed of a first portion 56 having the air inlet pipe 40a and a second portion 58 having the air outlet pipe 40b. As shown, the first and second portions are secured to each other in a manner that a flange $F_1$ of the first portion 56 is curled or bent over an annular flange $F_2$ of the second portion 58 inserting an annular seal member 60 therebetween. The air inlet and outlet pipes 40a and 40b are of the shape of nipple and securely inserted into the first and second pipes 42 and 44, respectively.

An outer cylindrical member 62 is disposed in the first portion 56 of the casing 40 so that the cylindrical outer surface of the outer cylindrical member 62 sealingly contacts with the inner cylindrical surface of the first portion 56. The cylindrical member 62 is formed at one end thereof with a circular opening 62a and at the other end thereof with an annular flange 62b. An inner cylindrical member 64 is disposed in the outer cylindrical member 62 so that its outer cylindrical surface is spaced apart from the inner surface of the outer cylindrical member 62 to define therebetween a chamber A. The inner cylindrical member 64 has an elastomeric member or stopper 64a at one end thereof and an annular flange 64b at the other end thereof. The outer periphery of the annular flange 64b is curled or bent over the annular flange 62b of the outer cylindrical member 62. The annular flange 64b is formed therethrough a plurality of openings 64c through which the chamber A communicates with an outlet chamber B defined in the second portion 58 of the casing 40. The outer peripheral portion of the curled flange 64b of the inner cylindrical member 64 sealingly contacts with the annular seal member 60.

Figure 4:
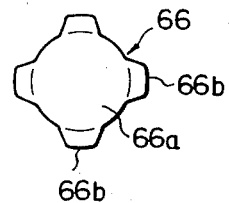
FIG. 4 is a plan view of an example of a valve member used in the intake vacuum control device of FIG. 3.

A valve member 66 is movably disposed in the chamber A to be seatable on an annular valve seat 68 which is secured to the inner surface of the a radial annular portion (no numeral) of an end of the outer cylindrical member 62 and around the circular opening 62a. The valve member 66 is of plate type and composed of a circular portion 66a and a four projecting portions 66b as shown in FIG. 4. The four projecting portions 66b are arranged radially and located equidistant from each other. The outermost periphery of each projecting portion 66b is slidable along the cylindrical inner surface of the outer cylindrical member 62. The valve member 66 is located spaced apart from the valve stopper 64a when being seated on the valve seat 68. However, the stopper 64a is located at a position to prevent the valve member 66 from its excessive movement toward the stopper 64a.

A coil or helical spring 70 is disposed between the valve member 66 and the flange 64b of the inner cylindrical member 64 to normally bias the valve member 66 to be seated on the valve seat 68. As viewed, the coil spring 70 is located around the inner cylindrical member 64 which is located coaxially with the outer cylindrical member 62 and the first portion 56 of the casing 40.

With the thus arranged intake vacuum control device 12, when the intake vacuum applied to the inside of the second pipe 44 exceeds the predetermined level, the valve member 66 is moved against the biasing force of the coil spring 70 toward the stopper 64a and accordingly separates from the valve seat 68. At this moment, air in the intake passageway 28 upstream of the throttle valve 32 is sucked into the chamber A of the control valve 12 through the first pipe 42, the inlet pipe 40a, and the opening 62a of the outer cylindrical member 62. The air supplied to the chamber A is then introduced to the intake passageway 28 downstream of the throttle valve 32. This lowers the intake vacuum in the intake passageway 28 downstream of the throttle valve 32 and therefore in the engine combustion chamber 20 during intake stroke.

Conversely, when the intake vacuum in the second pipe 44 becomes below the predetermined level, the valve member 66 is moved by the action of the coil spring 70 to be seated on the valve seat 68 so as to block communication between the chamber A and the intake passageway 28 upstream of the throttle valve 32. As a result, the intake vacuum downstream of the throttle valve 32 is again increased until it exceeds the predetermined level. It will be understood that the valve member 66 repeats its seated and unseated actions in vibrating manner to maintain the intake vacuum in the intake passageway 28 downstream of the throttle valve 32 at a predetermined level.

The intake vacuum control device 12 constructed as shown in FIG. 3 exhibits the following advantages. The valve member 66 is formed with four cut-out operations (no numerals) each of which is defined between the adjacent projecting portions 66b. By virtue of these cutout portions, the weight of the valve member 66 itself is decreased and air passages (no numerals) are defined between the periphery of the valve member 66 and the inner cylindrical surface of the outer cylindrical member 62. Therefore, the valve member 66 can be quickly moved in response to intake vacuum change, decreasing the flow resistance of bypass air passing through the control device 12. It is preferable that the inner cylindrical surface of the outer cylindrical member 62 is plated with chrome or lined with a stainless steel pipe. This can prevent the sliding surface for the valve member 66 from being rusted and therefore the sliding resistance of the valve member 66 can be decreased to a considerable extent.

The valve seat 68 is made of an elastomeric material such as fluorine-contained rubber and adhered annularly to the surface of the radial annular portion defining the opening 62a. Accordingly, air leak can be suppressed to an extreme low level when the control device 12 is fully closed or the valve member 66 is completely contacted with the valve seat 68. Additionally, the stopper 64a is also made of an elastomeric material such as a rubber. Hence, noises cannot be generated in the control device 12 although the metallic valve member 66 severely strikes against the valve seat 68 and the stopper 64a.

The inner cylindrical member 64 serves as a guide for the coil spring 70 and therefore prevents the coil spring 70 from its rateral movement. In this regard, the length of the inner cylindrical member 64 is preferably not less than 70%, and more preferably not less than 80% of the length of the coil spring 70 which is set between the flange 64b and the valve member 66. In this connection, if the inner cylindrical member 64 as the spring guide is omitted, the spring 70 is liable to laterally move since the length of the coil spring 70 in its set state is 1.5 to 3.0 times the outside diameter of the same. Therefore, it will be understood that the inner cylindrical member 64 can effectively prevent a poor sealing of the valve member 66 and the hysteresis phenomenon of the operation of the control device 12 by which the response of the valve member 66 is poor at the beginnings of the opening and closing operation of the valve member 66.

In order to obtain a sufficient amount of air flow, the lift of the valve member 66 or the distance between the valve member 66 and the stopper 64a is preferably about 1 mm, and about 2 mm in maximum. It is also preferable for decreasing the sliding resistance of the valve member 66, that the outer periphery of each projecting portion 66b is spaced apart from the inner cylindrical surface of the outer cylindrical member 62 by the range from 0.2 to 1.0 mm.

The outlet chamber B defined in the second portion 58 of the casing 40 functions to dampen the intake vacuum applied to the valve member 66 and therefore prevents the valve member 66 from fluttering.

FIGS. 5 and 6 shows another example of the valve member 66, in which a cylindrical projection 66c is formed integrally with the circular portion 66a. As shown, the cylindrical projection 66c is disposed inside of the coil spring 70 to serve as a spring guide for the spring 70.

FIG. 7 illustrates a second preferred embodiment of the intake vacuum control device 12 in accordance with the present invention, which is similar to the embodiment of FIG. 3 with the exception that the air outlet pipe 40b' of the second portion 58' is formed at its outer peripheral surface with a thread portion 72. This thread portion 72 is screwed into the thread portion (no numeral) of a cylindrical portion 74 of the wall 28a defining the intake passageway 28.

Figure 8:
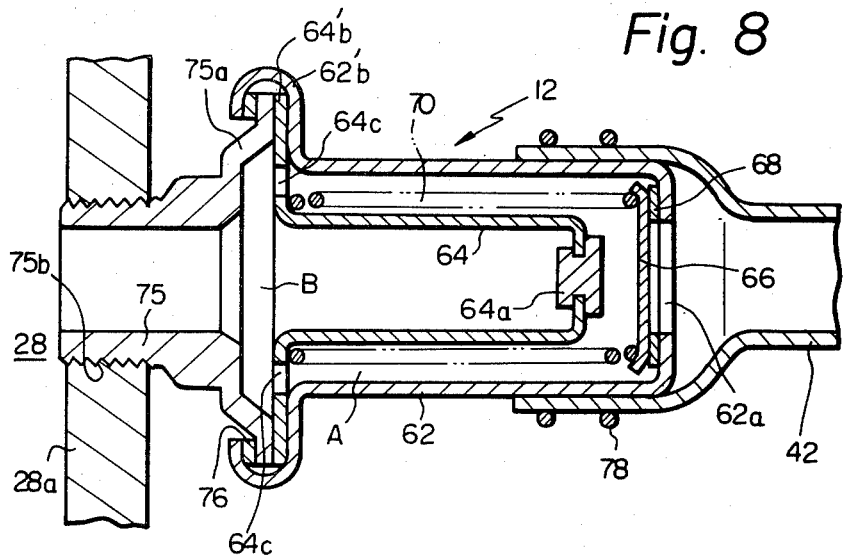
FIG. 8 is a cross-sectional view of a third preferred embodiment of the intake vacuum control device in accordance with present invention.

FIG. 8 illustrates a third preferred embodiment of the intake vacuum control device 12 according to the present invention. In this instance, the flange 62b' of the outer cylindrical member 62 is curled or bent over the flange 64b' and a flange 75a of an air outlet pipe number 75. Disposed between the flange 62b' and the flange 75a is an annular seal member 76 made of a metal such as aluminum. This seal member 76 may be omitted in case that the contacting surfaces of the flanges 62b' and 75a are smoothly flat. As shown, a thread portion 75b of the air outlet pipe member 75 is screwed into the thread portion (no numeral) formed through the wall 28a of the intake passageway 28 downstream of the throttle valve 32. In this instance, the air outlet pipe 40b is integrally forged and accordingly the intake vacuum control device 12 can be directly secured to the intake passageway wall 28a. The reference numeral 78 represents a clip member for securing the first pipe 42 (made of rubber) around the outer surface of the outer cylindrical member 62.

Figure 9:
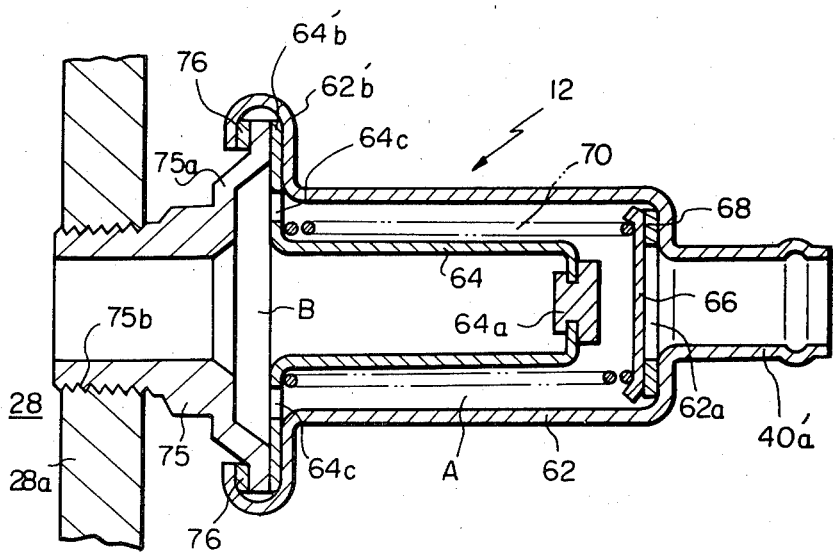
FIG. 9 is a cross-sectional view of a fourth preferred embodiment of the intake vacuum control device in accordance with the present invention.

FIG. 9 illustrates a fourth preferred embodiment of the intake vacuum control device 12 in accordance with the present invention, which is similar to the embodiment of FIG. 8 with the exception that the air inlet pipe 40a' is formed integrally with the outer cylindrical member 62.

Figure 10:
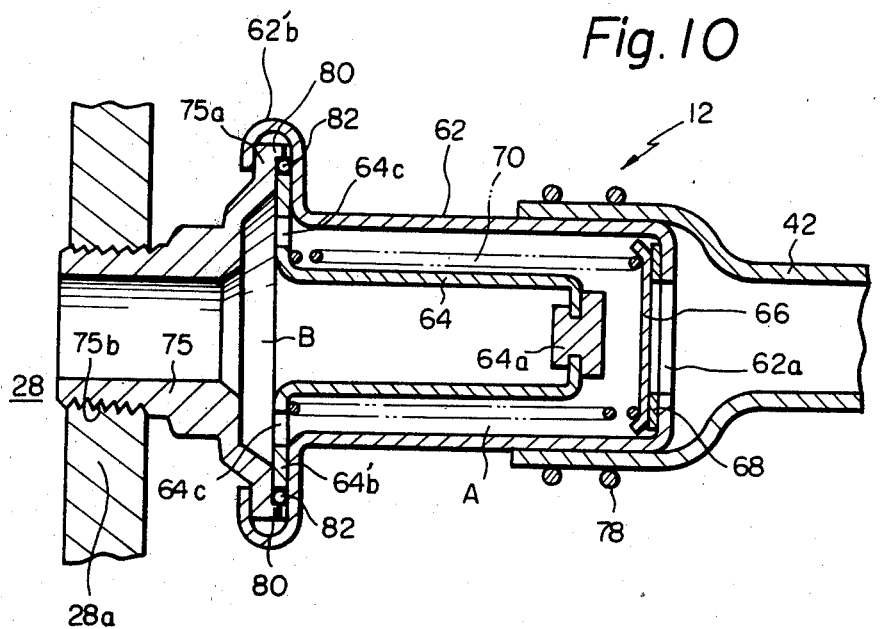
FIG. 10 is a cross-sectional view of a fifth preferred embodiment of the intake vacuum control device in accordance with the present invention.

FIG. 10 illustrates a fifth preferred embodiment of the intake vacuum control device 12 according to the present invention, which is similar to the embodiment of FIG. 8 except for the following facts: The flange 75a is formed along its periphery with an annular projection 80. As shown, on O-ring (ring-shaped seal member) 82 is put in a space which is defined by the flat surface of flange 75a, the inner side of the annular projection 80, the flat surface of the flange 62b' of the outer cylindrical member 62, and the peripheral edge of the flange 64b' of the inner cylindrical member 64.

Figure 11:
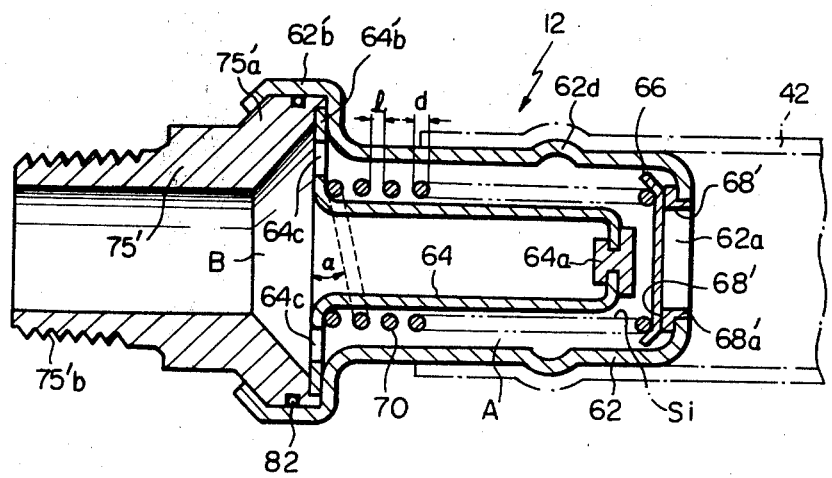
FIG. 11 is a cross-sectional view of a sixth preferred embodiment of the intake vacuum control device in accordance with the present invention.

FIG. 11 illustrates a sixth preferred embodiment of the intake vacuum control device 12 in accordance with the present invention, which is similar to the embodiment of FIG. 10 with the exception that the annular valve seat 68' is integrally formed with a cylindrical portion 68'a which fits to the periphery of the circular opening 62a formed at the outer cylindrical member 62. The outer cylindrical member 62 is formed at its outer cylindrical surface with an annular bulged portion 62d which functions to prevent the first pipe 42 from slipping out. Additionally, the O-ring 82 is disposed in a groove (no numeral) formed along the outer peripheral surface of the flange 75'a of the outlet portion 58 to prevent air leak between the flange 75'a and the flange 62b' of the outer cylindrical member 62.

In this embodiment, the coil spring 70 is constructed and arranged so that its peripheral surface $S_i$ is in close proximity to the outer cylindrical surface of the inner cylindrical member 64 to define therebetween a very small clearance which is smaller than the wire diameter d of the spring 70. The inclination angle $\alpha$ of the each coil of the spring 70 is selected to be not more than 5 degrees, preferably not more than 3 degrees. Additionally, the space l (distance) between adjacent coils is selected to be smaller than the wire diameter d of the spring 70 when the coil spring 70 is set in position or between the valve member 66 and the flange 64b' of the inner cylindrical member 64. By virtue of this, even when the coil spring 70 is broken, an broken end is prevented from being thrusted into the space between coils of the spring 70 and/or the space between the inner peripheral surface $S_i$ of the spring 70 and the outer cylindrical surface of the inner cylindrical member 64. The above-discussed arrangement of the coil spring 70 and its relationship to the inner cylindrical member 64 are applicable to various embodiments shown in FIGS. 3, 7, 8 to 10. In this case the free length, the set length as shown in FIG. 11, and the wire diameter d of the coil spring 70 are selected within the range from 20 to 55 mm, the range from 10 to 40 mm, and the range from 0.6 to 1.5 mm, respectively.

With the coil spring 70 arranged shown in FIG. 11, although the coil spring 70 is broken during engine operation, the broken spring is maintained around the inner cylindrical member 64 and accordingly it is prevented from being sucked into the combustion chambers 20 of the engine. Furthermore, since the space (distance) l between the adjacent spring coils is smaller than the spring wire diameter d, the broken spring never be thrusted into the same space and also into the space between the spring inner peripheral surface $S_i$ and the outer surface of the outer cylindrical member 64. Consequently, although the coil spring 70 is broken, only the pitch of the spring coils becomes smaller, maintaining the broken spring ends to contact with each other. This prevents the coil spring 70 from considerable lowering in its biasing force after the spring 70 is broken. In order to further improve the above-mentioned effect, it is preferable to select the dimensions of the coil spring 70 so that the spaces l (distances) between the adjacent spring coils are kept to be smaller than the spring wire diameter d even after the spring 70 is broken.

As a result, the intake vacuum control valve 12 can maintain its normal function. Accordingly, the control valve 12 is kept closed to stop air supply into the intake passageway 28 downstream of the throttle valve 32 therethrough during engine idling at which intake vacuum is, for example, 500 mmHg. Otherwise, even though the control valve 12 is opened during engine idling, air flow through the control valve 12 can be suppressed in an extremely small amount. Hence, the degradation in the engine operation is prevented during engine idling.

Figure 12:
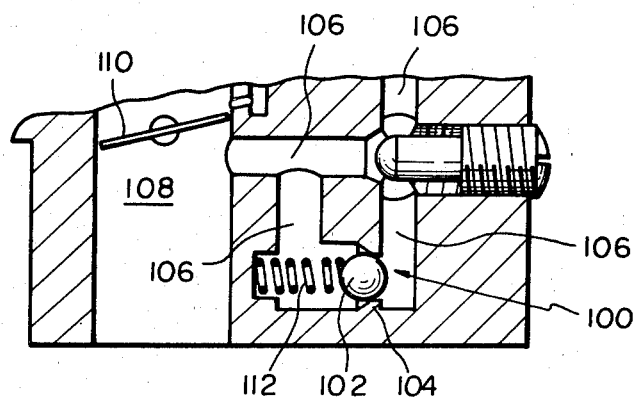
FIG. 12 is a vertical sectional view showing the construction of an example of prior art intake vacuum control device.

As appreciated from the foregoing discussion, the intake vacuum control device 12 of FIG. 11 is improved to a considerably extent over a prior art intake vacuum control valve shown in FIG. 12, which is disclosed in U.S. Pat. No. 3,866,583 to Dieter Pundt, and entitled "Mixture Control System for An Internal Combustion Engine with Controlled Injection Fuel". The prior art intake vacuum control valve 100 of ball type comprises a ball 102 which is movably seated on a valve seat 104. The valve seat 102 is formed at a portion of a bypass passage 106 through which the intake passageway 108 downstream of the throttle valve 110 is communicable with the intake passageway 108 upstream of the throttle valve 110. As shown, the movable ball 104 is biased by a herical spring 112 in the direction to be seated on the valve seat 104. With such an arrangement, when the intake vacuum in the intake passageway 108 downstream of the throttle valve 110 considerably increases, the ball 102 separates from the valve seat 104 against the basing force of the spring 112 and therefore air-fuel mixture is supplied to the intake passageway 108 downstream of the throttle valve 110 through the bypass passage 106.

During such an operation, if the spring 112 is broken, a broken piece of the spring is sucked into the cylinders of an engine through the bypass passage 106 downstream of the control valve 100. As a result, the broken spring piece may be inserted between an intake valve and a valve seat to damage them, and/or may damage pistons and cylinder bores. Furthermore, when the spring 112 is broken, the biasing force of the spring 112 is lowered to a considerable extent and accordingly the ball 102 completely separates from the valve seat 104. As a result, a large amount of air or air fuel mixture is introduced into engine cylinders. This unavoidably deteriorates the driveability of a vehicle, and the engine operation particularly during idling at which the throttle valve 110 is fully closed.

While the intake vacuum control device 12 according to the present invention has been shown and described to be used in combination with an internal combustion engine equipped with the electronically controlled fuel injection system, it will be understood that the control device 12 may be used in combination with internal combustion engines equipped with a carburetor in place of the fuel injection system.

Figure 2:
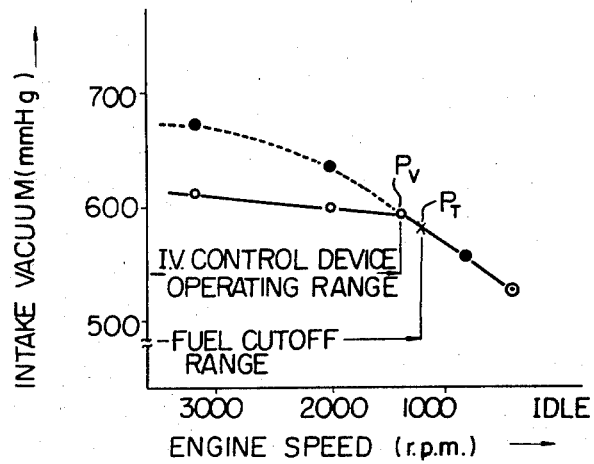
FIG. 2 is a graph showing a manner of operation of the intake vacuum control device in FIG. 1.

In case where the intake vacuum control device 12 according to the present invention is used in combination with a system for stopping fuel supply during engine deceleration, it is preferable the terminal timing of the "intake vacuum control device operating range" in FIG. 2 is set at a point which is equal to or higher, in intake vacuum and engine speed, than the terminal timing of the "fuel cutoff range" at which engine deceleration terminates. This prevent increases in fuel consumption, noxious gas emission levels, and engine oil consumption. However, it is permissible that the terminal timing of the "intake vacuum control device operating range" is lower, by 100–200 rpm in engine speed, than the terminal timing of the "fuel cutoff range" at which engine deceleration terminates. It is to be noted since the intake vacuum control device 12 according to the present invention may be operated during the "fuel cutoff range", the driveability of a motor vehicle provided with the control device 12 is not deteriorated though intake air or intake vacuum varies.

What is claimed is:

1. In an internal combustion engine having a combustion chamber, means defining an intake passageway providing communication between the combustion chamber and ambient air, and a throttle valve rotatably disposed in the intake passageway,
   an intake vacuum control device comprising:
   an outer cylindrical member formed at its first end with an air inlet opening through which the inside of said outer cylindrical member is communicable with the intake passageway upstream of the throttle valve;
   a valve seat secured to the inner surface of the first end of said outer cylindrical member and adjacent the air inlet opening, said valve seat being made of an elastomeric material;
   a movable valve member seatable on said valve seat;
   a coil spring disposed in said outer cylindrical member to bias said valve member to be seated on said valve seat; a cylindrical spring guide member disposed inside the coils of said coil spring, defining a chamber between it and said outer cylindrical member, said chamber being communicated with the intake passageway downstream of the throttle valve and communicable through the air inlet opening with the intake passageway upstream of the throttle valve, said spring guide member having a first end which faces to and is spaced from said valve member to restrict the movement of said valve member; and a valve stopper made of an elastomeric material and secured at the first end of said spring guide member so that said valve member is movable between said valve seat and said valve stopper.

2. In an internal combustion engine having a combustion chamber, means defining an intake passageway providing communication between the combustion chamber and ambient air, a throttle valve rotatably disposed in the intake passageway,
   an intake vacuum control device comprising:
   a casing having air inlet and outlets which are communicated with the intake passageway upstream and downstream of the throttle valve, respectively; and
   a vacuum control valve assembly securely disposed in said casing, said assembly including,
   an outer cylindrical member formed at its first end with an air inlet opening located in the vicinity of and communicated with the air inlet of said casing, said outer cylindrical member being formed at its first end with an annular portion defining the air inlet opening of circular shape at the central portion thereof,
   a valve seat secured to the inner surface of the first end of said outer cylindrical member and adjacent the air inlet opening, said valve seat being made of an elastomeric material and of annular shape, said valve seat being secured to the inner surface of said annular portion of said outer cylindrical member and located around the circular air inlet opening,
   a movable valve member seatable on said valve seat, said valve member being formed of a plate and including a circular portion and a plurality of radial projecting portions which are integral with said circular portion, said radial projecting portions being located generally equidistant from each other,
   a coil spring disposed in said outer cylindrical member to bias said valve member to be seated on said valve seat, a cylindrical spring guide member disposed inside the coils of said coil spring, defining a chamber between it and said outer cylindrical member, said chamber being communicated with the air outlet of said casing and communicable through the air inlet opening of said outer cylindrical member with the air inlet of said casing, said spring guide member having a first end which faces to and is spaced from said valve member to restrict the movement of said valve member, and a valve stopper made of an elastomeric material and secured at the first end of said spring guide member so that said valve member is movable between said valve seat and said valve stopper.

3. An intake vacuum control device as claimed in claim 2, in which said cylindrical spring guide member is formed at its second end with a flange which sealingly contacts with a second end of said outer cylindrical member, the flange of said cylindrical spring guide member having an air outlet opening through which said chamber communicates with the air outlet of said casing, said coil spring being seated on the flange of said cylindrical spring guide member.

4. An intake vacuum control device as claimed in claim 3, in which said coil spring and said cylindrical spring guide member are arranged coaxially with said outer cylindrical member.

5. An intake vacuum control device as claimed in claim 4, in which said valve member further includes a cylindrical projection around which said coil spring is disposed to be guided thereby.

6. An intake vacuum control device as claimed in claim 4, in which said valve member is movably located so that the peripheries of the projecting portions are spaced apart from the inner cylindrical surface of said outer cylindrical member by a range from 0.2 to 1.0 mm.

7. An intake vacuum control device as claimed in claim 5, in which the length of said spring guide member from its flange to its first end is not less than 70% of the length of said coil spring in its set state where said coil spring is put between the flange of said spring guide member and said valve member.

8. An intake vacuum control device as claimed in claim 7, in which the air inlet and outlet of said casing are directly connected to first and second pipes which are connected to the intake passageway upstream and downstream of the throttle valve, respectively.

9. An intake vacuum control device as claimed in claim 3, said coil spring so selected to contract so that said movable valve member separates from said valve seat to cause air to flow within the chamber in the direction from the air inlet opening to the air outlet opening of said vacuum control valve assembly, when the intake vacuum in the intake passageway downstream of the throttle valve exceeds a predetermined level.

10. An intake vacuum control device as claimed in claim 9, in which said predetermined level of the intake vacuum is about 600 mmHg.

* * * * *